US006480857B1

(12) United States Patent
Chandler

(10) Patent No.: US 6,480,857 B1
(45) Date of Patent: Nov. 12, 2002

(54) METHOD OF ORGANIZING HIERARCHICAL DATA IN A RELATIONAL DATABASE

(76) Inventor: David Chandler, 4723 Carrousel Dr. SW., Cedar Rapids, IA (US) 52404

( * ) Notice: Subject to any disclaimer, the term of this patent is extended or adjusted under 35 U.S.C. 154(b) by 0 days.

(21) Appl. No.: 09/875,924

(22) Filed: Jun. 7, 2001

(51) Int. Cl.[7] ................................. G06F 17/30
(52) U.S. Cl. ................. 707/100; 707/101; 707/102; 707/103 R
(58) Field of Search ................. 707/100, 101, 707/102, 103

(56) References Cited

U.S. PATENT DOCUMENTS

| | | | |
|---|---|---|---|
| 4,429,385 A | | 1/1984 | Cichelli et al. |
| 4,939,689 A | | 7/1990 | Davis et al. |
| 5,201,047 A | | 4/1993 | Maki et al. |
| 5,291,583 A | * | 3/1994 | Bapat ............ 707/100 |
| 5,295,256 A | * | 3/1994 | Bapat ............ 707/100 |
| 5,630,125 A | | 5/1997 | Zellweger |
| 5,724,577 A | * | 3/1998 | Exley et al. ........ 707/100 |
| 5,764,978 A | * | 6/1998 | Masumoto ......... 707/100 |
| 5,819,257 A | | 10/1998 | Monge et al. |
| 5,822,751 A | | 10/1998 | Gray et al. |
| 5,832,475 A | | 11/1998 | Agrawal et al. |
| 5,915,248 A | | 6/1999 | Kinoshita et al. |
| 5,937,409 A | * | 8/1999 | Wetherbee ......... 707/103 |
| 5,974,407 A | | 10/1999 | Sacks |
| 6,006,219 A | | 12/1999 | Rothschild |
| 6,006,233 A | | 12/1999 | Schultz |
| 6,009,432 A | | 12/1999 | Tarin |
| 6,029,162 A | | 2/2000 | Schultz |
| 6,047,284 A | * | 4/2000 | Owens et al. ......... 707/4 |
| 6,085,188 A | | 7/2000 | Bachmann et al. |
| 6,112,209 A | | 8/2000 | Gusack |
| 6,125,360 A | | 9/2000 | Witkowski et al. |
| 6,134,543 A | | 10/2000 | Witkowski et al. |
| 6,141,655 A | | 10/2000 | Johnson et al. |
| 6,192,373 B1 | | 2/2001 | Haegele |
| 6,202,063 B1 | | 3/2001 | Benedikt et al. |
| 6,208,993 B1 | | 3/2001 | Shadmon |

OTHER PUBLICATIONS

Bamji et al., Hierarchical Pitchmatching Compaction Using Minimum Design, ACM/IEEE Design Automation Conference, 1999, pp. 311–317.*

Chung et al., A Relational Query Language Interface to a Hierarchical Database management System, IEEE, 1989, pp. 105–112.*

Meng et al., Processing Hierarchical Queries in heterogeneous Environment, IEEE, 1992, pp. 394–401.*

Meng et al., A Theory of Translation From Relational Queries to Hierarchical Queries, IEEE, 1995, pp. 228–245.*

Meier et al., Hierarchical to Relational Database Migration, IEEE Software, 1994, pp. 21–27.*

Chung et al., Access to Indexed Hierarchical Databases Using a Relational Query Language, IEEE, 1993, pp. 155–161.*

* cited by examiner

Primary Examiner—Frantz Coby
(74) Attorney, Agent, or Firm—Daniel A. Rosenberg; Kent A. Herink; Davis Brown Law Firm

(57) ABSTRACT

A relational database is provided with a plurality of data entries stored in the database. The data entries have a hierarchical relationship. The data entries are assigned an item identifier that uniquely identifies each of the data items. A multiple digit outline number is assigned to each of the data entries wherein the digits of the outline number correspond to the hierarchical levels of the data entries. A hierarchical level identifier is assigned to each of the data entries wherein the hierarchical level identifier equal the number of non-zero digits in the outline number. An organizational table is created wherein the table includes a row for each of the data entries and the table includes multiple columns. The columns comprise a column for the item identifier, a plurality of outline number columns where each outline number column comprises one digit of the outline number such that each of the digits is stored in a separate column, and a hierarchical level column comprising the level identifier.

3 Claims, 4 Drawing Sheets

Tree

| Node ID | L1 | L2 | L3 |
|---|---|---|---|
| a | 1 | 0 | 0 |
| b | 1 | 1 | 0 |
| c | 1 | 2 | 0 |
| d | 1 | 2 | 1 |
| e | 1 | 2 | 2 |

Tree

| Node ID | Parent ID |
|---------|-----------|
| a | a |
| b | a |
| c | a |
| d | c |
| e | c |

(PRIOR ART)

Tree

| Node ID | LN | RN |
|---------|----|----|
| a | 1 | 10 |
| b | 2 | 3 |
| c | 4 | 9 |
| d | 5 | 6 |
| e | 7 | 8 |

(PRIOR ART)

Tree

| Node ID | Outline Number |
|---------|----------------|
| a       | 1              |
| b       | 1.1            |
| c       | 1.2            |
| d       | 1.2.1          |
| e       | 1.2.2          |

(PRIOR ART)

Tree

| Node ID | L1 | L2 | L3 |
|---------|----|----|----|
| a | 1 | 0 | 0 |
| b | 1 | 1 | 0 |
| c | 1 | 2 | 0 |
| d | 1 | 2 | 1 |
| e | 1 | 2 | 2 |

METHOD OF ORGANIZING HIERARCHICAL DATA IN A RELATIONAL DATABASE

BACKGROUND OF THE INVENTION

The present invention relates to a method of organizing hierarchical data in a relational database. In particular, this invention relates to a method of organizing hierarchical data in a relational database that uses an outline numbering system like the conventional numbered outline commonly found in a book's table of contents. The Outline Number is structured into digits separated by periods wherein the left most digit represents the highest-level parent, and each digit to the right represents progressively lower levels in the hierarchy.

The problem of choosing between a hierarchical database and a relational database comprises a fundamental problem in the art of database management and construction. In particular, many types of data conform to a hierarchical form or structure. For example, an employee organizational chart follows a hierarchical form. The company president sits at the top level of the hierarchy, and the next level would include the personnel that report to the president. This would continue on down until the chart placed each employee at the appropriate level in relation to each employee's supervisor. Similar hierarchical structures apply to the structure of computer filesystems, wherein at the top of the hierarchy is a root directory with a number of subdirectories underneath and with directories under the each of the subdirectories, and so on. Another classic application of a hierarchical database is the bill-of-material (BOM) application. In this application a hierarchical, or tree, structure serves to represent all of the parts required to assemble an item. The item would consist of a number of subassemblies, and the subassemblies would in turn consist of subassemblies and so on. The hierarchy would consist of the item at the top and then a list of subassemblies all the way down to the lowest level part.

A hierarchical database works well to organize data where each data element in the database is placed in a strict hierarchical relationship to some other element. Hierarchical databases are designed to process and manipulate data in a manner that takes advantage of the hierarchical relationship between data elements. In this regard, hierarchical databases are conceptually easy to understand and organize, and changing the structure or arrangement of the elements comprises at least a conceptually straightforward task. Hierarchical databases, however, suffer from some major drawbacks. Foremost, is the fact that they lack the ability to easily manage any relationship between the elements of the database other than the hierarchical relationship. For example, an organizational chart captures only a very small portion of the relationships between the employees. The locations of the employees' offices, special committee membership, and eligibility for benefits are examples of nonhierarchical relationships that would make a hierarchical database unsuitable for use. Accordingly, hierarchical databases do not work well to manage complex relationships between database elements.

As an alternative, relational database products exist that work well in managing complicated associations between information and data. For example, a document retrieval system could use a relational database to store information about related documents that would facilitate retrieval of documents that deal with similar subjects. The database could create a relationship between all documents that dealt with finance, or with legal matters, or with a specific person, or any other predefined relationship. Relational databases offer many benefits for software developers and database administrators, including a standard query language (SQL) and transaction processing suitable for mission-critical applications; however, relational databases do not easily adapt to storing hierarchical data. Accordingly, database managers and developers are often faced with selecting between a relational or hierarchical database, especially in consideration of the fact that many types of data require hierarchical and relational management.

The prior art describes several methods or devices to provide for cooperative development of hierarchical and relational data management. For example, U.S. Pat. No. 5,974,407 (Sacks) describes three categories of solutions to the problem: 1) the integration of separate hierarchical and relational databases along with the use of additional tools to support sharing between the two databases; 2) extending either the hierarchical or relational databases into the realm of the other database through the use of nonstandard Structured Query Language (SQL) programs; and 3) starting with one or the other database types and using native data structures to recreate the structure of the other type of database. However, prior art solutions involve increased complexity, extensive programming, and increased computational overhead.

More specific approaches to the problem using the first approach outlined above include various schemes to integrate hierarchical and relational databases. U.S. Pat. No. 5,724,577 (Exley et al.) describes a method of linking data stored in a hierarchical database with data stored in a relational database, which attempts to take advantage of arranging hierarchical data in an outline format. The method creates a table in a relational database that stores in a key field hierarchical outline heading numbers associated with particular data entries, thereby preserving the hierarchical information associated with each data element. Pointers are used to connect the data in the relational database with the data in the hierarchical database. Accordingly, the Exley et al. method requires the use of two databases. In addition, for reasons that will become apparent, by merely preserving the hierarchical information in a relational database the Exley et al. method does not create a relational database with any of the advantages of a hierarchical database. In other words, Exley et al. captures the hierarchical component of the data and stores it in a relational database, but does so in a manner that prevents efficient hierarchical processing of the data in the relational database.

U.S. Pat. No. 6,192,273 (Haegele) discloses a method that stores hierarchical data in a relational database table that includes a Caption Set Object Identifier (CSOID). The CSOID is a single number that stores all of the hierarchical information about a particular data entry. In the example offered in Haegele, the CSOID varies in length in multiples of three, wherein every set of three digits represents a particular level (or indent) in the hierarchy. Thus, the left most three digits would represent the position of a data item at the highest hierarchical level, and the right most three digits would represent the position of the data item at the lowest hierarchical level. While the method of Haegele represents an improvement on the method of Exley et al., in that it eliminates the need for multiple databases, it still suffers from the drawback that the arrangement of the hierarchical information does not allow for efficient hierarchical processing of the data in the relational database. The full extent of the deficiency of the Haegele data representation method will become apparent in reference to the present invention.

Accordingly, a need exists for an improved method of organizing hierarchical data stored in a relational database.

SUMMARY OF THE INVENTION

An object of the present invention comprises providing an improved method of organizing hierarchical data stored in a relational database.

These and other objects of the present invention will become apparent to those skilled in the art upon reference to the following specification, drawings, and claims.

The present invention intends to overcome the difficulties encountered heretofore. To that end, a relational database is provided with a plurality of data entries stored in the database. The data entries have a hierarchical relationship. The data entries are assigned an item identifier that uniquely identifies each of the data items. A multiple digit outline number is assigned to each of the data entries wherein the digits of the outline number correspond to the hierarchical levels of the data entries. A hierarchical level identifier is assigned to each of the data entries wherein the hierarchical level identifier represents the depth of the entry in the hierarchy and is equal to the number of non-zero digits in the outline number. An organizational table is created wherein the table includes a row for each of the data entries and the table includes multiple columns. The columns comprise a column for the item identifier, a plurality of outline number columns where each outline number column comprises one digit of the outline number such that each of the digits is stored in a separate column, and a hierarchical level column comprising the level identifier.

DETAILED DESCRIPTION OF THE INVENTION

Figure 1:
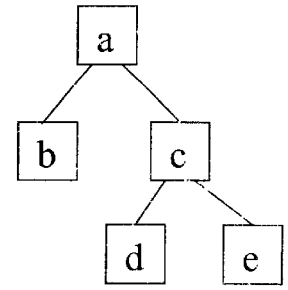
FIG. 1 shows in table and block diagram form a prior art method of organizing hierarchical data.

In the Figures, FIG. 1 shows a prior art a simple method for implementing hierarchical data in a relational database table. In this case the table consists of two rows, wherein one row stores a Node ID, and the other stores the Parent ID. The Parent ID represents the Node ID of the parent of any particular node. In particular, the table shown in FIG. 1 represents the hierarchical data shown in block form to the right of the table. The first row of the table represents Block "a," and the Node ID and the Parent ID for Block "a" both equal "a." The fact that the Node ID equals the Parent ID means that Block "a" has no parent, which will always be the case for the highest hierarchical data element. The table shows that Block "a" has two children, namely, Blocks "b" and "c." Thus, the Parent ID for Node ID "b" equals "a," and the Parent Id for Block "c" also equals "a." Similarly, Block "c" has two children, namely Blocks "d" and "e." The database table shown in FIG. 1 provides enough information to retrieve all possible hierarchical relationships among the data elements, however, extraction and manipulation of that information requires computationally complicated and expensive database operations.

Using the method shown in FIG. 1 to process and manipulate hierarchical data in a relational database requires the use of recursive programming techniques to recover related portions of the data. For example, consider the steps in recovering a complete sub-tree of the data, i.e. a node and all of that node's descendents on down to the lowest hierarchical level. The first step would comprise devising an algorithm that would search for all nodes with a Parent ID equal to the current Node ID, and then repeating the same algorithm for each node that satisfied the previous condition. This would continue until the algorithm reaches the lowest hierarchical level. Furthermore, in many cases, it is only after completing this operation to identify the entire sub-tree, that the processing that required the retrieval of the sub-tree in the first place can actually commence. While the recursive technique will succeed, the technique requires a great deal of computational time and overhead.

Figure 2:
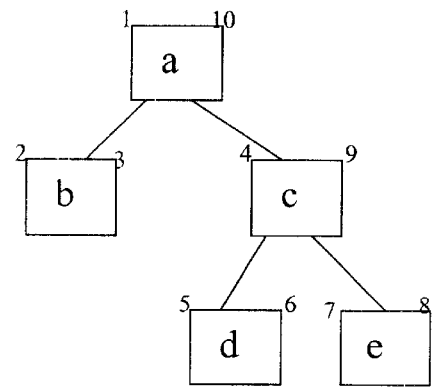
FIG. 2 shows in table and block diagram form another prior art method of organizing hierarchical data.

FIG. 2 shows another prior art method of implementing hierarchical data in a relational database table. In this case the table consists of three columns, and just like the table shown in FIG. 1 the table stores each data element (or block) in the block diagram to the right of the table shown in FIG. 2 in a single row. The data structure shown in FIG. 2 is identical to the structure of FIG. 1. Associated with each node is a Left Number (LN) and Right Number (RN). The LN and RN of any given node will define a nested set of descendent nodes such that all of the LNs and RNs of the descendents of a given node will fall numerically inside the LN and RN of the parent node. Referring to FIG. 2, the LN and RN of Node ID "a" capture all of the LNs and RNs for the rest of the nodes, which indicates that node "a" represents the highest hierarchical data element. Similarly, the LN and RN of node "c" capture the LNs and RNs of the two child nodes of node "c," namely, nodes "d" and "e."

While the method shown in FIG. 2 makes possible the retrieval and manipulation of the hierarchical data without the use of expensive recursive techniques, the method sacrifices the ability to easily add, remove, or reposition data elements. Using the example of recovering a sub-tree, the method of FIG. 2 makes this possible without recursion because knowing the LN and RN of a given node allows for quickly identifying all of the descendents of the node. The children will all have LNs greater than the LN of the parent, and RN's less than the RN of the parent. However, rearranging the hierarchical data structure requires reordering all, or most, of the LNs and RNs of the data structure. Rearranging the LNs and RNs cannot easily be done without the use of recursion, so this method of storing hierarchical data in a relational database proves quite difficult to put to practical use.

Figure 3:
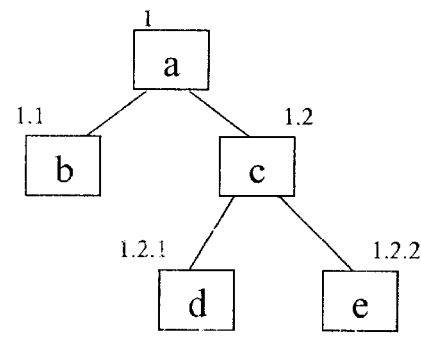
FIG. 3 shows in table and block diagram form yet another prior art method of organizing hierarchical data.

FIG. 3 shows yet another prior art method of implementing hierarchical data in a relational database table. This method utilizes a table containing two columns and one row per data element (or node). Like each of the previous methods one column stores a unique Node ID, an alphabetic identifier in this case. The other column stores an Outline Number, which consists of a conventional multiple level number commonly used in a table of contents of a textbook, for example. In this case, the second column stores the entire Outline Number. In reference to FIG. 3, Node ID "a" is assigned the Outline Number 1, Node ID "b" is assigned the Outline Number 1.1 indicating that it is the first child of Node ID "a", and Node ID "c" is assigned the Outline Number 1.2 indicating that it is the second child of Node ID "a," and so on to the lowest level of the hierarchical data element. Consequently, the Outline Number is structured into digits separated by periods wherein the left most digit represents the highest-level parent, and each digit to the right representing progressively lower levels in the hierarchy.

While the Outline Number successfully captures all of the hierarchical information about a given node and avoids the need for recursive processing techniques, the implementation shown in FIG. 3 suffers from one substantial drawback. Namely, the Outline Number comprises a string of text characters stored in a single database column. The processing of the Outline Number requires the use of expensive string operations to exploit the information contained therein. As will be explained in greater detail hereinbelow in reference to the present invention, this feature of the method shown in FIG. 3 still yields an unsatisfactory means of storing hierarchical data in a relational database.

Figure 4:
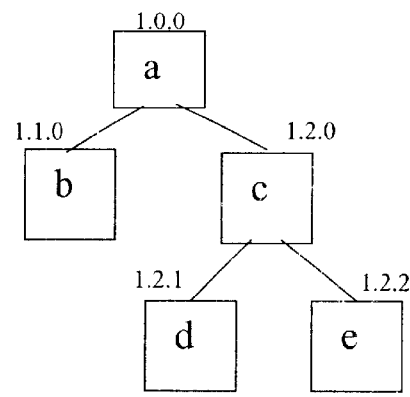
FIG. 4 shows in table and block diagram form a method of organizing hierarchical data.

FIG. 4 shows the method of the present invention. In this case, for the purposes of illustration the Outline Number is shown in the block diagram as a multiple digit number wherein periods separate the digits. Each Outline Number is shown above a particular node in the block diagram shown to the right of a four-column table. The table includes a column for the Node ID, the same Node IDs used in FIGS. 2 and 3. The remainder of the columns store a specific digit of the Outline Number. The columns are labeled L1, L2, and L3. In general the table would include LN columns, where N is a nonnegative integer. The maximum value of N equals the total number of hierarchical levels, where 1 represents the highest hierarchical level.

Storing each digit of the Outline Number in a separate integer column in the database alleviates the problems associated with the method shown in FIG. 3. Of course, each component of the Outline Number is not limited to a single digit integer value, but can be a number of any size.

Referring again to FIG. 4, the Outline Number 1.0.0 represents the highest hierarchical level and is associated with Node ID "a." The Outline Numbers 1.1.0 and 1.2.0 represent the children of Node ID "a," namely, Node IDs "b" and "c" respectively. For each Node ID, each digit of the Outline Number is stored in a separate column of the table, even if the digit equals zero. The number of columns with non-zero values equals the depth of the data element in the hierarchy.

In the preferred embodiment of the present invention the table would include the following columns

| Column Name | Description |
|---|---|
| TreeID | An identifier applied to all the data elements of a particular tree |
| NodeID | An item identifier applied to each data element in a particular tree |
| L1 ... LN | For an Outline Number with N digits there will be N columns, with one column for each digit, preferably the left most column storing the highest hierarchical level and the right most column storing the lowest hierarchical level |
| TreeLevel | For each data element the TreeLevel represents the depth of that data element in the hierarchy |

The TreeID makes it possible to store information relating to multiple tree structures in a single relational database table. The TreeLevel is a helpful data item but not absolutely essential due to the fact that this information can be obtained from the L1 ... LN digit information. The number N of the right most LN column with a nonzero digit represents the depth of any particular data element. However, it some applications it may prove easier to store this number in a separate column rather than calculate the number each time it is needed.

Storing the digits of the Outline Number in separate columns allows for constructing very efficient queries of a type not possible with the prior art methods. In particular reference to the method shown in FIG. 3, consider the steps required to move a data element within a tree (i.e. changing the Outline Number). First the Outline Number string needs to be parsed into the respective digits, then adding and subtracting the appropriate digits as necessary would need to be performed, and then the digits need to be converted back to string values and the new Outline Number reconstructed. By storing the digits of the Outline Number in separate columns the present invention substantially simplifies these operations by avoiding performing string operations that are typically slow and cumbersome to write, and by quickly isolating and operating on the appropriate digit in the Outline Number.

For example, using the character string implementation show in FIG. 3, consider inserting a new node with an Outline Number of 1.4 inserted before the existing node 1.4. This requires renumbering all higher sibling nodes to make room for the new node. In this example, the Outline Number is three characters wide, composed of two digits separated by a period, and is right justified. Zeros instead of spaces could be used as placeholders to justify each digit in the Outline Number, but this makes the SQL statement even more complicated. In Microsoft SQL Server, the statement to perform insertion and renumbering using the method of FIG. 3 consists of the following:

UPDATE Tree
SET NodeIDStr='1.'
+STR (CAST (SUBSTRING (NodeIDStr, 5, 3) AS int)+1, 3)
+SUBSTRING (NodeIDStr, 8, LEN (NodeIDStr)—LEN ('1.4')
WHERE NodeIDStr LIKE '1.%'
AND NodeIDStr>='1.4'

This routine involves many expensive string operations. Due to the tediousness of the SQL string operations, many programmers will prefer to renumber the tree in application code rather than in a single SQL statement. This introduces the possibility that the application processing will be interrupted (as by a server or network outage) and the tree numbering may be left in an inconsistent state.

By contrast, using the method of the present invention, updating the tree requires only one step, namely, adding or subtracting from the affected columns using a simple UPDATE statement. Again, in Microsoft SQL Server, the SQL statement would consist of the following:

UPDATE Tree
SET L2=L2+1
WHERE L1=1 AND L2>=4

Because the renumbering can be completed entirely in SQL, the database engine's built-in transaction support ensures that even if the renumbering operation is interrupted, the tree numbering will remain in a consistent state.

The present invention also allows for performing other common hierarchical database operations within the context of a relational database in a manner much more efficient than possible with prior art methods. Consider the following examples:

To return all the descendents of a given node in a tree, the query simply finds all the nodes with an Outline Number that matches the non-zero digits of the given node. To return the entire tree where the highest level Outline Number is 1.0.0 the statement would consist of the following:

```
SELECT *
FROM Tree
WHERE L1=1
ORDER BY L1, L2, L3
```
The ORDER BY clause serves to return all the nodes in outline order. A composite index on these columns in the database is normally maintained to improve query performance.

To return the sub-tree for the node with the Outline Number 1.2.0, the statement would consist of the following:
```
SELECT *
FROM Tree
WHERE L1=1
   AND L2=2
ORDER BY L1, L2, L3
```
Notice that the query structure is different depending on the depth and position of the given node in the query. In other words, the above query statements would need to change if the number of non-zero columns in the Outline Number of the given node changed. At first, this would appear to be a disadvantage of using multiple database columns to store the digits of an Outline Number. However, the invention overcomes this limitation by using the SQL CASE statement to formulate a query that works regardless of the depth of the node.

To retrieve all descendants of any node having a four digit Outline Number of the form N1.N2.N3.N4, the statement would consist of the following:
```
SELECT *
FROM Tree
WHERE TreeID=@TreeID
   and L1=case when (@n1>0) then @n1 else L1 end
   and L2=case when (@n2>0) then @n2 else L2 end
   and L3=case when (@n3>0) then @n3 else L3 end
   and L4=case when (@n4>0) then @n4 else L4 end
```
Note that this statement would work without alteration in a tree with a maximum of four levels, regardless of the node's depth in the tree.

To insert a new data element or node requires assigning the non-zero digits from the parent node's Outline Number to the new node, and then assigning an additional right most digit based on the new node's position among its siblings. Because the database automatically adds the new row to all indexes on the table, the tree order is maintained without any additional effort on the part of the programmer. The prior art technique of using left numbers and right numbers does not have this property.

If the order of sibling nodes is significant and there is a need to insert a new node between two siblings, some renumbering of the sibling nodes (of that parent only) is required to make room for the new node. This is easily done with a single UPDATE statement. For example, to add a new data element that is a child of a data element with the Outline Number 1.0.0, where the new data element will appear first among its siblings (i.e. the new data element will have the Outline Number 1. 1.0), the statement to renumber the siblings would consist of the following:
```
UPDATE Tree
SET L2=L2+1
WHERE L1=1
   AND L2>=1
```
To delete a single node merely requires deleting the row for which the Outline Number matches exactly. For example, to delete a data element with the Outline Number 1.2.1 would consist of the following statement:
```
DELETE
FROM Tree
WHERE L1=1
   AND L2=2
   AND L3=1
```
To delete an entire sub-tree requires deleting all rows for which the significant (non-zero) digits of the Outline Number match those of the parent node being deleted. For example, removing a data element with the Outline Number 1.2.0 and all descendent data elements, would consist of the following statement:
```
DELETE
FROM Tree
WHERE L1=1
   AND L2=2
```
Optionally, after the DELETE statement, a statement could be included to renumber the sibling nodes of the deleted node to fill any gap that may be left. However, this is only necessary if an application requires that there be no gaps in the Outline Numbers within a tree.

In addition to the foregoing, it will be understood by those of ordinary skill in the art that the method of the present invention will efficiently accomplish many other common operations associated with the processing of hierarchical data. Including relocating a node or sub-tree. Moving a node requires the following steps: 1) renumber the portion of the tree where the node will be inserted; 2) write the UPDATE statement which changes the outline numbers for the node or sub-tree to correspond to its new position; and 3) if necessary renumber the former siblings of the node which was moved to eliminate any gaps.

If the moved node has descendents the routine must consider whether to move the entire sub-tree (i.e. to move a node and its descendents), or to assign the descendents to a different parent. In either event this requires checking to find any descendent nodes and then writing the query in such a way as to move the entire sub-tree or reassign the descendents. Otherwise, the routine will orphan the descendent nodes. The query disclosed hereinabove to retrieve descendant nodes could check for child nodes before moving a node.

In all tree-processing applications, it is necessary to avoid circularity. That is, Node A cannot be a child of Node B if Node A is already in the parent path of Node B. Using the numbering system and data model which is the subject of this invention, it is trivial to check for circularity before inserting a node. Before attempting to insert Node B as a child of Node A, the routine would check for circularity by querying for the descendants of Node B as illustrated previously to determine if Node A's Outline Number is among the Outline Numbers of the descendents of Node B. If Node A were among the descendants, then the routine would not make Node B a child of Node A.

A more complex situation occurs in the case of extended circularity, which arises when a hierarchical database includes a data element in more than one place in the tree. For example, in a bill of materials application, it is common for a particular part to be included in multiple assemblies. In this case, the part could occur as a node in multiple assembly trees. Using the previous example, a check for extended circularity requires a circularity query of the descendants of Item B each time it occurs as a node in a tree.

To further illustrate the advantage of the present invention over the method shown in FIG. 3, consider the SQL statements needed to renumber a sub-tree at any given level of a hierarchical database using string operations on the Outline Number as taught by the method of FIG. 3. For a tree with a maximum depth of 4 levels, the code would consist of the following:

```
CREATE PROCEDURE RenumberTreeFromNode
@NodeID int AS
DECLARE @StartNodePrefix varchar(50),
    @FixedPart varchar(50),
    @treeLevel int,
    @updColPos int
SELECT @StartNodePrefix=NodeIDStr
FROM Tree
WHERE NodeID=NodeID
SET @FixedPart=LEFT (@StartNodePrefix, 4)
SET @treeLevel=(LEN (@StartNodePrefix)+1)/4
SELECT @updColPos=(((@treeLevel-1) * 4)+1
UPDATE Tree SET NodeIDStr=@FixedPart
+STR (CAST (SUBSTRING (NodeIDStr, @updColPos,
    3) AS int)+1, 3)
+SUBSTRING (NodeIDStr, @updColPos+3, LEN
    (NodeIDStr)-LEN (@StartNodePrefix))
WHERE NodeIDStr LIKE @StartNodePrefix+'%'
    AND NodeIDStr>=@StartNodePrefix
```

The corresponding procedure to renumber nodes at any level is easily built using the SQL CASE statement according to the method of the present invention. The following example also assumes an Outline Number with four digits:

```
CREATE PROCEDURE RenumberTreeFromNode
@NodeID int
AS
DECLARE @n1 int, @n2 int, @n3 int, @n4 int,
    @treeLevel tinyint
SELECT @n1=L1, @n2=L2, @n3=L3, @n4=L4,
    @treeLevel=treeLevel
FROM Tree
WHERE NodeID=@NodeID
UPDATE Tree
SET
L1=CASE when (@treeLevel=1) then L1+1 else L1 end,
L2=CASE when (@treeLevel=2) then L2+1 else L2 end,
L3=CASE when (@treeLevel=3) then L3+1 else L3 end,
L4=CASE when (@treeLevel=4) then L4+1 else L4 end
WHERE L1=CASE when (@treeLevel>1) then @n1 else
    L1 end
AND L2=CASE when (@treeLevel>2) then @n2 else L2
    end
AND L3=CASE when (@treeLevel>3) then @n3 else L3
    end
AND L4=CASE when (@treeLevel>4) then @n4 else L4
    end
AND L1>=CASE when (@treeLevel=1) then @n1 else
    L1 end
AND L2>=CASE when (@treeLevel=2) then @n2 else
    L2 end
AND L3>=CASE when (@treeLevel=3) then @n3 else
    L3 end
AND L4>=CASE when (@treeLevel=4) then @n4 else
    L4 end
```

Accordingly, the present invention in its preferred embodiment comprises a numbering system, data model, and associated algorithms for representing a hierarchical data structure (or tree structure) in a relational database, with the following properties: 1) every node in the tree requires exactly one row in the database; 2) every node in the tree is assigned a series of numbers (the Outline Number) which uniquely identify the node's location in the tree; 3) each digit of a node's Outline Number is stored in a separate database column (one column for each digit or level in the tree); 4) the database table may be indexed on the columns containing the digits of the Outline Number thereby making it possible to efficiently retrieve any sub-tree with a single, non-recursive query; 5) the series of digits for each node capture all of the information about the nodes placement in the hierarchy, making it possible to transparently retrieve the parent hierarchy (transitive closure) for any node; and 6) when any node or branch is inserted, moved, or deleted, only a single, efficient UPDATE statement is required to renumber the sibling nodes and all the nodes in their sub-trees. In addition, the invention teaches the use of the SQL CASE statement to write SQL queries that can operate on nodes at any level in the tree.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

I claim:

1. A method of organizing hierarchical data in a relational database, said method comprising:

providing a relational database;

providing a plurality of data entries stored in said relational database, wherein there exists a hierarchical relationship among said data entries;

assigning a node identifier to each of said data entries that identifies each of said data items;

assigning a multiple digit outline number to each of said data entries wherein said each of said digits of said outline number represents a hierarchical level of said data entries;

creating an organizational table wherein said table includes a row for each of said data entries, the columns of said table comprising:

a node identifier column comprising said node identifier; and a plurality of outline number columns wherein each of said outline number columns comprise one digit of said outline number such that each of said digits is stored in a separate column.

2. The invention in accordance with claim 1 further comprising the step of assigning a hierarchical level identifier to each of said data entries wherein said hierarchical level identifier equals the depth of the entry in the hierarchy, and wherein said organizational table further comprises a hierarchical level column comprising said hierarchical level identifier.

3. The invention in accordance with claim 1 further comprising the step of assigning a tree identifier to all of said data entries that have a common hierarchical relationship, and wherein said organizational table further comprises a tree identifier column comprising said tree identifier.

* * * * *